United States Patent [19]

Kagiyama et al.

[11] Patent Number: 4,727,108
[45] Date of Patent: Feb. 23, 1988

[54] POLYESTER COMPOSITIONS AND PROCESS OF PREPARING POLYESTER FILMS FROM THEM

[75] Inventors: Takashi Kagiyama, Sagamihara; Kazuo Endo, Yokohama; Chikakazu Kawaguchi, Yokohama; Yosio Meguro, Yokohama; Kazuhiro Kunugihara, Tokyo, all of Japan

[73] Assignee: Diafoil Company, Limited, Tokyo, Japan

[21] Appl. No.: 921,248

[22] Filed: Oct. 21, 1986

[30] Foreign Application Priority Data

Oct. 21, 1985 [JP] Japan .................... 60-235063
Nov. 5, 1985 [JP] Japan .................... 60-247676
Apr. 8, 1986 [JP] Japan .................... 61-80387

[51] Int. Cl.$^4$ .................................................. C08K 3/26
[52] U.S. Cl. .................................. 524/425; 524/604; 524/605
[58] Field of Search .................... 524/425; 106/306

[56] References Cited

U.S. PATENT DOCUMENTS 3,003,010 10/1961 Meuret et al. .............. 524/425
4,175,066 11/1979 Shibazaki et al. ............ 524/425
4,595,715 6/1986 Kuze et al. .................. 524/425

Primary Examiner—Lewis T. Jacobs
Attorney, Agent, or Firm—Oblon, Fisher, Spivak, McClelland & Maier

[57] ABSTRACT

Disclosed herein is a polyester composition comprising 0.001–5% by weight of particles which have an average particle size of 0.05–5 micrometers, are mainly composed of calcium carbonate and contain 0.001–5% by weight of at least one compound selected from the group consisting of magnesium compounds, strontium compounds and barium compounds.

Also disclosed herein is a process for preparing a polyester film by the electrostatic cooling method, which process is characterized by using the polyester composition of the present invention.

8 Claims, 1 Drawing Figure

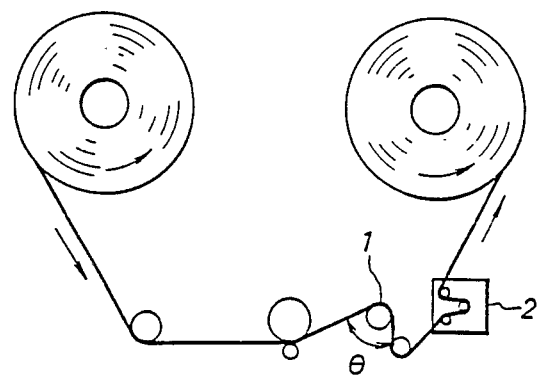

POLYESTER COMPOSITIONS AND PROCESS OF PREPARING POLYESTER FILMS FROM THEM

BACKGROUND OF THE INVENTION

1. Field of the Invention

The present invention relates to polyester compositions and a process for preparing polyester films by utilizing such compositions.

More particularly, this invention relates to polyester compositions which are excellent in dispersibility in the molten state, pass well through filters in the extrusion steps, and can be made into films having few coarse surface protrusions, excellent sliding properties (slipperiness), and high abrasion resistance.

2. Prior Art

Polyester films, especially biaxially oriented polyester films, including polyethylene terephthalate films, have widely been used as base films for magnetic tapes, capacitors, packaging materials, plate materials in photomechanical processes, electrically insulating materials, etc., owing to their excellent electrical, mechanical and thermal properties as well as good workability and high chemical resistance.

The specific characteristics required for such polyester films may differ depending on their use, but mention may particularly be made of excellent sliding properties and few coarse protrusions on their surface, which are generally essential requirements common to conventionally available films. In particular, it is very important for films to have good sliding properties since such properties may influence winding workability in film production steps, easy handling of films in post-treatment steps such as coating, vacuum deposition, slitting, winding-up, etc., and even quality of final products, for example, running properties of magnetic tapes produced therefrom or the resistance of the tapes against guide pins and other elements.

Generally, fine unevenness may be given to films on their surface to improve their sliding properties. In order to provide such fine unevenness on the film surface, a method has been well known in which residual metal compounds used as catalysts in the polymerization processes of polyesters may be deposited in the form of fine particles in the reaction system.

Also well known is a method in which fine particles inert to polyesters are added in the process of producing polyesters or in the extrusion steps thereof so as to form protrusions on the surface of resulting films, and thereby to give sliding properties thereto: this method will hereinafter be called "the particle addition method". Such particles used in the particle addition method may include natural or synthetic calcium carbonate, natural clays and minerals, which have been adjusted to proper particle sizes by crushing, classifying and/or other means.

Recently, requirements for film quality have become sterner, and especially reduction of long-lasting undulation of films, namely improvement of the precision in thickness, has been considered to be essential to the film quality.

For this end, there has been known the so-called electrostatic cooling method in which a sheet melt-extruded through a nozzle is closely adhered to a cooled surface. However, when the speed of the rotating cooling drum is increased so as to improve productivity in this electrostatic cooling method, the adhesive force of the extruded sheet to the cooling drum will be reduced, thereby resulting in the formation of the so-called pinning bubble. Such pinning bubble in the product films must be avoided to satisfy the quality requirements.

Generally, the higher the specific resistance of the melt of starting polyester materials, the greater is the tendency of said pinning bubble to generate. More specifically, when the specific resistance as measured by a method mentioned later has a value equal to or greater than $5 \times 10^8$ ohm.cm, said pinning bubble tends to be formed. Thus, such higher specific resistance will make it difficult to efficiently obtain films of high quality.

As one of the methods for preventing the formation of such pinning bubble, it has been proposed to add a metal compound during the polyester preparation process to thereby reduce the specific resistance of the polyester melt, as disclosed, for instance, in Japanese Patent Application Laying-open No. 70269/76. However, this method is unsatisfactory and further reduction of the specific resistance of polyester melt to a desired degree has still been demanded.

In the particle addition method used to improve the slipperiness of polyester films, the particles are usually dispersed in an appropriate medium such as ethylene glycol, water, an alcohol, or the like, and then added to the polycondensation reaction system for producing polyesters. It is imperative that the particles are well dispersible in the medium such as ethylene glycol and any substantial gross agglomeration of the particles does not take place in the polycondensation reaction system: that is, the particles should be uniformly dispersed in the polyester.

Although coarse particles which cannot be uniformly dispersed in the slurry medium such as ethylene glycol or in the polycondensed polymer may preliminarily be eliminated by classification or any other method to obtain those having a relatively sharp particle size distribution, the possible agglomeration of the added particles may cause serious problems: the surface roughness of the resulting films may vary; or, in certain severe cases, the filter used in the extrusion step may be plugged. Further, coarse protrusions may be formed on the film surface.

If such films are made into magnetic tapes, a decrease of output or an increase of drop-out may be caused. Similarly, when such films are used in capacitors, various troubles, e.g., a decrease of the voltage which the capacitor can withstand, etc. may be produced.

As previously stated, the particles of natural calcium carbonate used to add to polyesters have been obtained through repeated crushing and classification steps. However, there have been inevitable limitations on the sharpness of the particle size distribution and on the removal of coarse particles. Thus, conventional particles of natural calcium carbonate do not have a satisfactory quality for particles to be added to polyester films.

When such conventional particles are added to polyesters in an amount necessary for improving the sliding properties and abrasion resistance of the resulting films, the number of coarse protrusions in the films may be increased, and the back pressure of the filter in the extrusion step may be greatly increased resulting in an increase of the number of exchange of such filters and in a reduction of productivity.

In order to avoid such problems, it is necessary to remove coarse particles by many times repeating crushing and classification of calcium carbonate to obtain particles having a sharp distribution of particle size. This will, however, increase the number of treating steps and hence cause an economical disadvantage. Further, the resulting fine particles of calcium carbonate are not uniformly dispersed in media such as ethylene glycol or in polyesters, and agglomeration thereof may occur in ethylene glycol or the polyester resulting in the formation of coarse particles. Thus, such particles derived from natural calcium carbonate are far from practical.

On the other hand, synthetic calcium carbonate may generally be prepared by well known methods, such as the carbonatation of milk of lime, $Ca(OH)_2$, the addition of an aqueous solution of sodium carbonate or ammonium carbonate to an aqueous solution of calcium chloride, and the so-called calcium chloride method.

However, the primary particles of such synthetic calcium carbonate usually exhibit a very strong cohesive force and hence many primary particles agglomerate together with one another to form larger secondary particles. Such secondary particles are very difficult to completely break up into the smaller primary particles in the good particulate state even if the synthetic calcium carbonate is vigorously stirred for a long period of time. For example, when grinding or crushing is carried out by a ball mill, a powerful sand grinder, or the like, the agglomerate, secondary particles can substantially be broken up into the smaller primary particles while at the same time the primary particles may also be broken into much smaller particles. The resulting fine particles will have an unstable surface state and contain both particles having smaller particle sizes than those of the desired primary particles and incompletely broken secondary particles: hence, the particles will have a wide distribution of particle size. Further, they will tend to agglomerate again in the polyester due to their unstableness.

Therefore, the use of such synthetic calcium carbonate is limited to a very narrow range of applications; it cannot have been applied to films requiring especially highly precise surface characteristics, for example, magnetic tapes or capacitors.

In the electrostatic cooling method employed to improve the precision of film thickness, a problem may be caused when the specific resistance of the starting polyester melt is reduced in order to prevent the formation of pinning bubble: thus, as the specific resistance of the melt is reduced, the thermal stability of the polyester will generally become poorer and the degree of polymerization may be decreased and/or the formation of degraded products may be enhanced resulting in the loss of film stability in the continuous preparation thereof by extrusion.

Thus, there has been a primary need to provide a method of reducing the specific resistance of the polyester melt as greatly as possible while retaining the thermal stability of the polyester.

SUMMARY OF THE INVENTION

The present inventors have made great efforts to study the dispersibility of calcium carbonate and the formation of coarse agglomerate particles in the particle addition method, and now found that calcium carbonate containing a magnesium (Mg), strontium (Sr) or barium (Ba) compound has a sharp distribution of particle size and a low content of coarse particles, is excellent in the dispersibility in a medium such as ethylene glycol etc., and forms almost no agglomerate particle when added to the polycondensation reaction system for polyesters, and that a polyester composition comprising such calcium carbonate shows a very low specific resistance in the molten state.

The present invention has been made on the basis of such findings.

Accordingly, a primary object of this invention is to solve the problems in the particle addition method, particularly in such a method using calcium carbonate as particles to be added.

Thus, an object of the present invention is to provide a novel polyester composition which shows a low pressurizing speed to a filter in the extrusion process by utilizing particles of calcium carbonate having a sharp distribution of particle size and excellent dispersibility in a medium such as ethylene glycol or a polyester. Further, films derived from such a composition exhibit excellent slipperiness and abrasion resistance and have very few coarse protrusions.

Another object of this invention is to provide a process of preparing polyester films which show a very low specific resistance in the molten state, will permit higher film-production speeds, are excellent in the slipperiness and abrasion resistance, and have very few coarse protrusions.

These objects may be attained by novel polyester compositions containing 0.001–5% by weight of particles of 0.05–5 microns in particle diameter based on calcium carbonate which further contain 0.001–5% by weight of one or more compounds selected from the group consisting of Mg compounds, Sr compounds and Ba compounds, as well as by the method of preparing polyester films by the electrostatic cooling method using such compositions.

BRIEF DESCRIPTION OF THE DRAWING

The sole FIGURE illustrates the film running system used to estimate the abrasion resistance of films in the examples and comparative examples.

DETAILED DESCRIPTION OF THE INVENTION

The present invention will now be described in more detail.

The term "polyester" used herein refers to polyesters obtained by the polycondensation reaction from starting materials comprising an aromatic dicarboxylic acid such as terephthalic acid, naphthalene-2,6-dicarboxylic acid or the like or an ester thereof and ethylene glycol.

The starting materials may further contain one or more other components. Various aromatic dicarboxylic acids, including isophthalic acid, can be used as the other components. A variety of glycols which can be used as the other components include propylene glycol, tetramethylene glycol, diethylene glycol, neopentyl glycol, etc., and any mixture thereof, as well as polyalkylene glycols. In any case, preferred polyesters used in the invention are those in which at least 80% by mole of recurring structural units comprise ethylene-terephthalate or ethylene-2,6-naphthalene units.

Catalysts used in the polycondensation reaction for synthesizing polyesters may be those employed in conventional polycondensation reactions, for example, Sb, Ge, Ti, Sn or Si compounds.

Particles incorporated in the polyesters to improve the surface characteristics and slipperiness of films derived from the polyesters according to the present invention are essentially comprised of calcium carbonate and contain 0.001-5% by weight of one or more compounds selected from the group consisting of Sr (strontium) compounds, Ba (barium) compounds and Mg (magnesium) compounds. Such particles have an average particle size (diameter) of 0.05-5 micrometers.

Preferably, the calcium carbonate used in this invention comprises those having the calcite structure and may be synthesized by the so-called carbonic acid gas reaction method wherein carbon dioxide gas is reacted with an aqueous suspension of calcium hydroxide.

The compounds contained in the calcium carbonate particles may include carbonates, sulfates, chlorides, hydroxides, oxides, and the likes, of Mg, Sr and Ba.

These compounds may generally comprise 0.001-5% by weight, preferably 0.005-5% by weight, more preferably 0.01-4% by weight, based on the combined amount of calcium carbonate and the compound(s), i.e., the total amount of the particles to be added. If the amount of the Mg, Sr or Ba compounds is less than 0.001% by weight, the dispersibility of the particles in a medium such as ethylene glycol and in polyesters will not significantly be improved. With amounts of 5% by weight or more, no further improvement in the dispersibility will be observed, but rather it may lead to an increase of cost for production and, furthermore, the surface characteristics of the resulting films, for example, slipperiness or abrasion resistance, may be adversely affected.

The particles based on calcium carbonate generally have an average particle size (diameter) in the range of from 0.05 to 5 micrometers. Particles having an average particle size smaller than 0.05 micrometers will merely give films with unsatisfactory slipperiness. If particles with an average particle size larger than 5 micrometers are employed, the resulting films have too large surface roughnesses and the quality thereof may be deteriorated due to particles having significantly large particle sizes.

It is preferred to obtain calcium carbonate particles having a desired particle size by suitably selecting the reaction conditions in known processes for preparing calcium carbonate by the carbonatation.

Generally, in the process for preparing calcium carbonate, wherein milk of lime comprising calcium hydroxide is prepared, carbonic acid gas is introduced into the milk of lime to effect the carbonatation reaction, and preferably prior to or during the carbonatation, one or more Mg, Sr and/or Ba compounds are added, particle sizes of the synthesized fine particles of calcium carbonate may depend on the combination of various factors, such as initial concentrations of the milk of lime, reaction temperatures, strength of stirring, and concentrations and flow rates of the carbonic acid gas introduced into the milk of lime. Thus, suitable choice of these reaction conditions will make it possible to obtain calcium carbonate having desired particle size.

The particles used in the present invention can also be obtained easily by crushing or grinding those particles based on calcium carbonate but having relatively large particle sizes, for example, mixed particles of 1-10 micrometers comprising synthetic calcium carbonate and one or two Mg, Sr and/or Ba compounds which are synthesized by the carbonatation reaction, until appropriate particle sizes are obtained, by means of a ball mill, rod mill, vibrating ball mill, vibrating rod mill, roller mill, impact mill, disk mill, stirred grinding mill, fluid energy mill, or the like.

Preferably, the thus obtained fine particles based on calcium carbonate may be subjected to dry or wet classification, filtration or other suitable treatment for removing coarse particles. The classification may preferably be carried out by utilizing the semi-free vortex or forced vortex system, the hydrocyclone system, the centrifugation, or the like.

The amount of the calcium carbonate-based particles added to the polyester compositions according to the present invention is 0.001-5% by weight. If the amount is less than 0.001% by weight, improvements in the slipperiness and abrasion resistance of the resulting films will be unsatisfactory. If the amount exceeds 5% by weight, the surface roughness of the resulting films may be too high, or the number of coarse protrusions may be increased, or even the filter used in the extrusion step for forming films may be plugged. Preferred amounts of the particles added are 0.01 to 5% by weight.

In the process for preparing the polyester compositions according to the present invention, addition of the particles may preferably be carried out during the synthesis reaction of polyester. It is particularly preferred to add the particles either prior to or during or after the transesterification or esterification reaction, but in any case, before the initiation of the polycondensation reaction.

The particles are usually added in the form of slurry containing 3-50% by weight of particles in a solvent such as ethylene glycol. If the concentration of the particles in the slurry is less than 3% by weight, the amounts of ethylene glycol to be used, that is, the ethylene glycol units in the slurry, will be too large. If slurries containing more than 50% by weight of particles are added, the dispersibility of the particles may sometimes be impaired.

It is preferred that the polyester compositions according to the present invention also contain an additional compound having a calcium binding ability at 90° C. of 100 to 400, in addition to the particles of calcium carbonate containing one or more Mg, Sr and/or Ba compounds.

The "calcium binding ability at 90° C." herein means the ability of compounds to form complexes with calcium ions as described in, for example, Cham. Z., 99, 182 (1975). Among various compounds having higher ability to form complexes with calcium, those having the value in the range of 100 to 400 at 90° C. may effectively prevent the agglomeration of calcium carbonate in the polyester polycondensation process. Any significant effect will hardly be obtained with compounds having the ability less than 100. Values of 150 or more are preferred. Compounds with a value more than 400 will exhibit poor dispersibility in the slurry and/or polymer.

Preferred additional compounds for use in the present invention may include, for example, phosphoric and carboxylic acid compounds, such as sodium tripolyphosphate (110), aminotrimethylene phosphate (200), ethylenediaminetetraacetic acid (150), cyclopentane-1,2,3,4-tetracarboxylic acid (230), O-carboxymethyltartronic acid (120), polyacrylic acids (260), poly(alphahydroxyacrylic acids) (180), poly-(3-hydroxymethylhexamethylene-1,3,5-tricarboxylic acids) (130), poly-(4-methoxy-tetramethylene-1,2-dicarboxylic acids) (250), and poly-(tetramethylene-1,2-dicarboxylic acids) (230), as well as alkali metal salts thereof. Also shown in parentheses are the respective values of the calcium binding ability of these compounds, i.e., the amount of CaO to be bound to unit weight of each compound (mg CaO/g).

The amount of the additional compound(s) added to polyester together with calcium carbonate is 0.001–10% by weight, based on the weight of the calcium carbonate. If the amount is less than 0.001% by weight, the agglomeration of calcium carbonate cannot effectively be prevented. If on the other hand more than 10% by weight of the additional compound(s) is added, no further improvement in the prevention of agglomeration can be effected, but rather the dispersibility of the compounds will sometimes become poor.

There is no special limitation on the time of incorporating the additional compound(s). For example, such compounds may be added to the aqueous slurry of calcium carbonate obtained from the synthesis reaction, or they may also be added to the medium such as ethylene glycol into which synthesized calcium carbonate is re-dispersed or has been re-dispersed after drying. Further, they may also be added in the step of classification, filtration or the like. In any case, it is preferred that such compounds are combined or mixed with calcium carbonate before the compounds and/or calcium carbonate are added to the reaction system of polyester.

In addition to calcium carbonate, the polyester composition of the invention may also contain other fine particles of amorphous zeolite, anatase titanium dioxide, calcium phosphate, silica, kaolin, talc, clay, etc. The amount of these additional particles added may preferably be 0.005–1% by weight of the total polyester composition.

Moreover, the composition of the present invention may also contain fine particles precipitated by the reaction of the residual amount of catalyst used in the polycondensation to synthesize polyester with phosphorus compounds. Such precipitated fine particles may include, for example, those comprising calcium, lithium and phosphorus compound(s), those comprising calcium and phosphorus compound(s), or those comprising calcium, magnesium and phosphorus compound(s). The amount of these particles contained in the polyester is preferably 0.05–1.0% by weight.

Now, a process for preparing polyesters films according to the present invention by utilizing aforementioned composition will be hereinbelow described.

Te electrostatic cooling method which may preferably be employed to prepare polyester films according to the present invention is known in the art as described in, for example, Japanese Patent Publication No. 6142/62.

The polyester resin compositions which may be used as starting materials in the electrostatic cooling method to produce films according to this invention contain the above specified calcium carbonate as added particle and usually have a specific resistance of $0.1$–$1.9 \times 10^7$ ohm.cm in the molten state. The specific resistance in this range will enable the effective prevention of the formation of pinning bubble during high speed film production without impairing the thermal stability of the melt. Specific resistances less than $0.1 \times 10^7$ ohm.cm will lead to poor stability. Specific resistances larger than $1.9 \times 10^7$ ohm.cm will result in the formation of pinning bubble during the high speed film production.

In the process of the present invention, if necessary, both calcium carbonate of the invention and a phosphorus compound can be added to the system for polymerizing polyesters, or a small amount of other metallic compound(s) can also be employed together with them. Such metallic compounds may include those of calcium, magnesium, manganese, zinc, sodium, potassium, etc. These compounds may be used in any form provided that they can be dissolved in ethylene glycol, but they are usually used in the form of metal salts of aliphatic carboxylic acids such as acetic acid, propionic acid and the like.

Such compounds may be utilized as catalysts in the process for preparing polyesters or can be separately in another process for producing polyesters. Phosphorus compounds which may be used include known orthophosphoric acid, phosphorous acid, and esters and half esters thereof as well as phosphonic acid.

The thus obtained polyesters containing added calcium carbonate particles and having a specific resistance of $0.1$–$1.9 \times 10^7$ ohm.cm in the molten state can be used either singly or in combination with other polyester(s), for example, those having a specific resistance of $5 \times 10^7$ ohm.cm or higher, or even $10 \times 10^7$ ohm.cm or higher, in the molten state.

In the latter case, those conventional polyesters having higher specific resistances, wherein the speed of film production could not have been enhanced due to their high specific resistances, can also be made into films with higher speeds in the extrusion step by combining them with the polyesters of the present invention to reduce the specific resistance of the resulting composition.

The thus obtained polyester films of the present invention can be stretched by any conventional known method, for example, as described in Japanese Patent Publication No. 5639/55, to obtain oriented films. Further, longitudinally and/or transversely reinforced and/or tensilized films can be easily prepared from the polyester films of the present invention. In addition, the polyester compositions of the present invention may also be suitable for starting materials of films having unevenness on the surface thereof.

Preferably, the polyester films of the present invention have a surface roughness, an average height of protrusions (Ra), of 0.004–0.200 and a film thickness of 1–400 micrometers, particularly 1–200 micrometers.

The polyester films of the present invention may be very useful as base films of magnetic recording media, including magnetic tapes and floppy disks, or as base films for capacitors, plate materials in photomechanical processes, electrically insulating materials, thermo-sensitive transfer materials, packaging materials, transfer marks, tinsels, etc., in various fields.

The particles to be added to the polyesters according to the present invention, which are mainly composed of calcium carbonate, contain a predetermined amount of at least one Mg, Sr or Ba compound and have a predetermined particle size, are substantially free of coarse particle, have a very sharp distribution of particle size, cause almost no agglomeration between the particles themselves, and exhibit good dispersibility in a medium such as ethylene glycol, so that they may uniformly be dispersed in the system for preparing polyesters without causing the agglomeration. Therefore, various disadvantageous problems associated with poor dispersibility of conventional particles can be avoided.

Films derived from the polyester compositions containing such particles according to the present invention are much more excellent in the surface roughness and slipperiness as compared with those derived from compositions containing conventioanl particles: thus, the films are very flat and slippery. Further, they also have excellent abrasion resistance and running properties.

In particular, the compositions of the present invention may be used as good starting materials for preparing unoriented films by the electrostatic cooling method and films having good precision in thickness as well as aforementioned properties can be produced with high speeds. Accordingly, the films of the present invention may sufficiently satisfy the requirements for base films of high density magnetic recording media which will be highly demanded in future.

DESCRIPTION OF THE PREFERRED EMBODIMENTS

The following examples will be given by way of illustrating the present invention in comparison with the comparative examples but these examples are not construed as limiting of the invention.

In the following examples and comparative examples all parts and percents are by weight unless otherwise specified.

Various properties in the following examples and comparative examples are defined and were determined as follows: (1) Average Particle Diameter:

Average particle diameter of various particles, including those based on calcium carbonate, was graphically determined by electron microscopy. (2) Intrinsic Viscosity ($\eta$):

Intrinsic viscosity was measured at 30° C. in a solution of one gram of polymer in 100 ml of a mixed solvent phenol/tetrachloroethane (50/50, wt/wt). (3) Average Protrusion Height (Ra):

Maximum height (Rmax) of protrusions in micron was measured according to JIS (Japanese Industrial Standard) B0601-1976. Measurements were carried out by a surface roughness tester Model SE-3F, manufactured by KOSAKA KENKYUJO, Japan, with diameter of the needle in contact of 2 microns; load of the needle in contact of 30 mg; cut-off value of 0.08 mm; and measured length of 2.5 mm. Measurements were made at twelve (12) points for each sample and the maximum and minimum values were discarded. The average protrusion height shown was calculated from ten (10) measured data.

(4) Kinetic Friction Coefficient to Metal ($\mu_d$):

A film was contacted onto a fixed, hard, chromeplated roller of 6 mm in diameter with a winding angle ($\theta$) of 135°. One end of this film was then drawn with a force ($T_2$) of 53 grams in a running speed of 1 m/min. The resistive force ($T_1$) in gram was measured at the other end of the film. The friction coefficient ($\mu_d$) during running was calculated by the following equation:

$$\mu_d = (1/\theta)\ln(T_1/T_2)$$
$$= 0.424 \ln(T_1/53)$$

(5) Estimation of Abrasion Resistance:

Abrasion resistance was estimated using a film running system shown in the accompanying drawing.

A film was passed through the running system over a film length of 500 m. The amount of film material adhered due to wear onto the surface of a fixed, hard chromeplated (SUS 420 J2) pin 1 of 6 mm in diameter with the surface finished to 0.2 S was visually observed. The film speed was 10 m/min, the tension as measured by a tensiometer 2 was about 200 g, and the winding angle ($\theta$) was 135°. The results are estimated on the basis of the following criteria:

Good ... No or almost no adhesion of film material on the pin surface;

Fair ... Slight adhesion of film material on the pin surface; or

Poor ... Much adhesion of film material on the pin surface.

(6) Number of Coarse Protrusions:

Aluminum was vacuum deposited on the film surface and the number of surface protrusions was measured by a dual beam interference microscope. The number of protrusions showing the n-th order interference fringe at a measuring wavelength used of 0.54 microns is shown per 25 cm². The number of protrusions showing the third or higher order interference fringer per 25 cm² is shown as $F_3$ while that of protrusions showing the fourth or higher order interference fringe per 25 cm² is shown as $F_4$.

(7) Evaluation of Plugging of Filter:

A sample of polyester resin was extruded with a constant speed from an extruder of 40 mm in diameter where a 2000 mesh wire gauze filter was provided in a filter pack. The pressure rise at the inlet of the filter pack was evaluated. The pressure rise for the amount of polyester resin containing 0.4% kaolin particles of 0.8 microns in average diameter to be passed through the filter was taken as the reference value 1.0 and the evaluated values for various samples are shown as relative values in relation to the reference. Larger values than 1.0 mean more filter plugging, indicating that such resins are undesirable for making films.

(8) Specific Resistance of Polyester Melt:

The method described in Brit. J. Appl. Phys., 17, 1149–1154 (1966) was used where the temperature for melting polymer compositions was 290° C. The specific resistance of the resin melt was measured immediately after applying D.C. 3,000 V.

(9) Non-uniformity of Thickness of Polyester Film:

The film thickness was measured at each of ten (10) points with 10 cm apart from each other along the width of the film, every 1,000 m along the longitudinal length of the film: thus, the total number of measuring points were hundred (100). Measurements were made by a micrometer manufactured by ADACHI DENSHI, Japan. Ten layered films was used to measure thicknesses and each value for one sheet of film was derived from such values obtained for ten layered films.

The non-uniformity of film thickness was calculated from the following equation:

$$(X_{mas} - X_{min})/X_{av}$$

wherein $X_{max}$ is the maximum value measured, $X_{min}$ is the minimum value and $X_{av}$ is the arithmetic mean value. The smaller this value is, the more preferable the film is. Values of 0.13 or less are particularly preferred.

EXAMPLE 1

Synthesis of Particles Based on Calcium Carbonate

Twenty (20) liters of milk of lime containing 200 g/l of calcium hydroxide was heated at 40° C. Then, 10.8 g (0.2% based on the amount of the resulting particles) of SrCO₃ was added to the heated solution, and the mixture was stirred to mix well. Carbonic acid gas with a carbon dioxide concentration of 25% by volume was then introduced in a flow rate of 400 l/hr and the reaction was allowed to proceed while stirring. After 20 hour reaction, the rate of introducing carbonic acid gas was reduced to 4 l/hr. The reaction was further continued for 10 days. There was obtained an aqueous slurry of calcium carbonate containing $SrCO_3$ and having the calcite structure and an average particle diameter of 0.85 microns.

Preparation of Polyester Composition

After concentrating the slurry by a filter press and further drying, the slurry was dispersed in ethylene glycol by T.K. homomixer, manufactured by TOKU-SHU KIKA KOGYO, Japan. The particles were very well dispersed in ethylene glycol and almost no agglomeration nor precipitation of particles was observed.

The resulting slurry of calcium carbonate-based particles in ethylene glycol was classified and filtered. The obtained ethylene glycol slurry had 16% of particles with an average particle diameter of 0.8 microns.

Separately, 100 parts of dimethyl terephthalate, 60 parts of ethylene glycol and 0.09 parts of magnesium acetate tetrahydrate were charged into a reaction vessel. Transesterification was effected by heating while distilling off methanol. After 4 hours, the temperature was increased to 230° C. to substantially terminate the transesterification reaction.

After 0.04 parts of ethyl acid phosphate was added to the reaction mixture, 2.5 parts of the above described slurry of particles with an average particle diameter of 0.8 microns and then 0.04 parts of antimony trioxide were added. Polycondensation was effected for 4 hours to obtain polyethylene terephthalate resin having an intrinsic viscosity of 0.64.

The obtained polyester resin was heated to dry at 180° C. under nitrogen for 6 hours and extruded from an extruder into a sheet of 220 microns in thickness. The sheet was stretched 3.7 times as large as the original longitudinal length and 4 times as large as the original transverse length. The sheet was then heat set at 220° C. for 5 seconds. There was obtained a biaxially oriented polyethylene terephthalate film of 15 microns in thickness.

The properties of the film are listed in Table 1.

EXAMPLE 2

Synthesis of Particles to Be Added

The procedures of Example 1 were repeated except that $SrSO_4$ was added during the synthesis reaction in such an amount as to provide 0.3%, based on the resulting particles, of $SrSO_4$ in the final particles. There was obtained an aqueous slurry of calcium carbonate containing $SrSO_4$. They had the calcite structure and an average particle diameter of 1.2 microns.

Preparation of Polyester Composition

The slurry was concentrated, dried and dispersed in ethylene glycol as in Example 1. After classifying and filtering, there was finally obtained a slurry of particles having an average particle diameter of 1.1 microns which were uniformly and well dispersed in ethylene glycol.

The resulting slurry was added to the oligomer after the completion of the transesterification reaction, and polycondensation reaction was effected, as described in Example 1. There was obtained a polyester resin containing 0.4% of calcium carbonate-based particles. A film of 15 microns in thickness was prepared from the resin as in Example 1.

The properties of the film are shown in Table 1.

EXAMPLES 3 and 4

Almost same procedures as in Example 1 were used to prepare biaxially oriented polyester films: thus, the period of time for the synthesis reaction as described in Example 1 was shorter in these examples, so that calcium carbonate particles containing $SrCO_3$ of 0.6 or 0.4 microns in average particle diameter for Example 3 or 4, respectively, were obtained after dispersion, classification and filtration.

The properties of the obtained film are shown in Table 1 below.

EXAMPLES 5, 6 and 7

In Example 5, $SrCO_3$ was added to the ethylene glycol slurry during the preparation thereof in an amount of 0.4%, while in Example 6, $SrCO_3$ was added to the aqueous slurry after the carbonatation reaction in an amount of 0.4%. In Example 7, $BaSO_4$ was added in an amount of 0.3% based on the resulting particles instead of $SrCO_3$. Other procedures were same as in Example 1.

The properties of the resulting biaxially oriented polyester films are shown in Table 1.

As readily seen from Table 1, degrees of the pressure rise at the filter in the polyester resin extrusion step were low in all Examples 1 to 7; thus, the obtained films had few coarse protrusions and very excellent properties.

COMPARATIVE EXAMPLE 1

The procedures of Example 1 were used to prepare calcium carbonate of 1.5 microns in average particle diameter except that no $SrCO_3$ was added. The particles were crushed by a sand grinder, classified and filtered to obtain a slurry of particles having an average particle diameter of 0.8 microns in ethylene glycol.

The procedures of Example 1 were again repeated to prepare a biaxially oriented polyester film of 15 microns in thickness by adding the slurry obtained above.

The properties of the film are also shown in Table 1.

As seen from Table 1, the pressure rise at the filter in the extrusion step is much higher in the composition of this Comparative Example 1 and the film derived from such a composition has more coarse protrusions due to agglomeration of particles as compared with the composition and film of Examples described above. Thus, the film of this Comparative Example has poorer properties.

COMPARATIVE EXAMPLE 2

Natural calcium carbonate was subjected to crushing and classification repeatedly to obtain particles of 0.8 microns in average particle diameter. By using these particles, the procedures of Example 1 were repeated to prepare a polyester resin containing 0.4% of calcium carbonate and to produce a biaxially oriented polyester film of 15 microns in thickness by extrusion.

The properties of the resulting film are also shown in Table 1.

As seen from Table 1, the pressure rise at the filter in the extrusion step is much higher in the composition of this Comparative Example 2 and the film derived from such a composition has more coarse protrusions due to agglomeration of particles as compared with the composition and film of Examples described above. Thus, the film of this Comparative Example has poor properties.

COMPARATIVE EXAMPLE 3

The procedures of Example 1 were again repeated to prepare a polyester resin and a biaxially oriented film of 15 microns in thickness by extrusion except that the calcium carbonate-based particles were replaced by 0.4% of kaolin particles having an average particle diameter of 0.8 microns.

The properties of the resulting film are also shown in Table 1.

As seen from Table 1, the film of this Comparative Example was poorer in the roughness, slipperiness, abrasion resistance and number of coarse protrusions as compared with the film of Example 1.

The resulting slurry of calcium carbonate-based fine particles in ethylene glycol was classified and filtered. The obtained ethylene glycol slurry had 18% of particles with an average particle diameter of 0.8 microns.

Separately, 100 parts of dimethyl terephthalate, 60 parts of ethylene glycol and 0.09 parts of magnesium acetate tetrahydrate were charged into a reaction vessel. Transesterification was effected by heating while distilling off methanol. After 4 hours, the temperature was increased to 230° C. to substantially terminate the transesterification reaction.

After 0.4 parts of ethyl acid phosphate was added to the reaction mixture, 2.2 parts of the above described slurry of particles with an average particle diameter of

TABLE 1

| | Added Particles | | | | Film Properties | | | | |
|---|---|---|---|---|---|---|---|---|---|
| | Additional compound contained in $CaCO_3$* | | Average particle diameter (micron) | Amount of particles added to polyester (%) | Evaluated plugging of filter by resin | Average protrusion height, Ra (micron) | Friction coefficient to metal ($\mu_d$) | Number of coarse protrusions per 25 cm² | | Abrasion resistance |
| | Kind | Added amount (%) | | | | | | $F_3$ | $F_4$ | |
| Ex. 1 | $SrCO_3$ | 0.2 | 0.8 | 0.4 | 0.7 | 0.018 | 0.25 | 550 | 120 | Good |
| 2 | $SrCO_3$ | 0.3 | 1.1 | 0.4 | 1.1 | 0.027 | 0.23 | 820 | 150 | Good |
| 3 | $SrCO_3$ | 0.2 | 0.6 | 0.4 | 0.6 | 0.015 | 0.27 | 340 | 60 | Good to Fair |
| 4 | $SrCO_3$ | 0.2 | 0.4 | 0.4 | 0.6 | 0.009 | 0.30 | 420 | 40 | Fair |
| 5 | $SrCO_3$ | 0.4 | 0.8 | 0.2 | 0.8 | 0.021 | 0.24 | 780 | 230 | Good |
| 6 | $SrCO_3$ | 0.4 | 0.4 | 0.3 | 0.7 | 0.008 | 0.31 | 640 | 210 | Fair |
| 7 | $BaSO_4$ | 0.3 | 0.8 | 0.4 | 0.9 | 0.019 | 0.25 | 660 | 190 | Good |
| Comp. Ex. 1 | Crushed and classified synthetic $CaCO_3$ | | 0.8 | 0.4 | 11.3 | 0.021 | 0.24 | 5000 | 700 | Good |
| Comp. Ex. 2 | Crushed and classified natural $CaCO_3$ | | 0.8 | 0.4 | 2.1 | 0.016 | 0.26 | 2700 | 320 | Good |
| Comp. Ex. 3 | Kaolin particles | | 0.8 | 0.4 | 1.0 | 0.020 | 0.32 | 1200 | 240 | Poor |

*The amount of the compound contained in $CaCO_3$ is about a half to a fourth of the added amount.

EXAMPLE 8

Synthesis of Calcium Carbonate Particles

Twenty (20) liters of milk of lime containing 200 g/l of calcium hydroxide was heated at 60° C. Then, 16.2 g (corresponding to 0.3% based on the resulting particles) of $SrCO_3$ was added to the heated solution, and the mixture was stirred to mix well. Carbonic acid gas with a carbon dioxide concentration of 25% by volume was then introduced in a flow rate of 400 l/hr and the reaction was allowed to proceed while stirring. After 24 hour reaction, the rate of introducing carbonic acid gas was reduced to 4 l/hr. The reaction was further continued for 14 days. There was obtained an aqueous slurry of calcium carbonate containing $SrCO_3$ and having the calcite structure and an average particle diameter of 0.9 microns. There was then added 21.6 g (corresponding to 0.4% based on the resulting particles) of polyacrylic acid to the slurry.

Preparation of Polyester Composition

After concentrating the slurry by a filter press and further drying, the slurry was dispersed in ethylene glycol by T.K. homomixer, manufactured by TOKU-SHU KIKA KOGYO, Japan. The particles were very well dispersed in ethylene glycol and almost no agglomeration nor precipitation of particles was observed even after the slurry was allowed to stand for 20 hours.

0.8 microns and then 0.04 parts of antimony trioxide were added. Polycondensation was effected for 4 hours to obtain polyethylene terephthalate resin having an intrinsic viscosity of 0.64.

The obtained polyester resin was heated to dry at 180° C. in a nitrogen environment for 6 hours and extruded through an extruder into a sheet of 220 microns in thickness. The sheet was longitudinally stretched 3.7 times as largely as the original length and then transversely 4 times as largely as the original length. The sheet was then heat set at 220° C. for 5 seconds. There was obtained a biaxially oriented polyethylene terephthalate film of 15 microns in thickness.

The properties of the film are listed in Table 2.

EXAMPLE 9

The procedures of Example 8 were repeated except that $SrSO_4$ was added during the synthesis reaction in such an amount as to provide 0.3%, based on the resulting particles, of $SrSO_4$ in the final particles, and that simultaneously the reaction period of time was prolonged. There was obtained an aqueous slurry of calcium carbonate containing $SrSO_4$. They had the calcite structure and an average particle diameter of 1.1 microns. To the aqueous slurry, there was added sodium tripolyphosphate in an amount of 0.2% based on the resulting calcium carbonate.

The slurry was concentrated, dried and dispersed in ethylene glycol as in Example 8. After classifying and filtering, there was finally obtained a slurry of particles having an average particle diameter of 1.0 microns which were uniformly and well dispersed in ethylene glycol.

The resulting slurry was added to the oligomer after the completion of the transesterification reaction, and polycondensation reaction was then effected, as described in Example 8. There was obtained a polyester resin containing 0.4% of calcium carbonate-based particles. A film of 15 microns in thickness was prepared from the resin as in Example 8.

The properties of the film are shown in Table 2.

EXAMPLE 10

In the synthesis of calcium carbonate described in Example 8, the reaction period of time was shortened to obtain calcium carbonate particles of 0.7 microns in average particle diameter containing 0.3% of $SrCO_3$. To the aqueous slurry comprising the particles, there was added 0.5%, based on calcium carbonate, of poly-((4-methoxy)-tetramethylene-1,2-dicarboxylic acid), and the mixture was classified and filtered to obtain fine particles of calcium carbonate having an average particle diameter of 0.6 microns. The resulting particles were concentrated, dried and dispersed in ethylene glycol.

Then, the same procedures as in Example 8 were used to prepare a biaxially oriented polyester film containing 0.4% of calcium carbonate.

The properties of the obtained film are shown in Table 2 below.

EXAMPLE 11

In the synthesis of calcium carbonate, the reaction period of time was shortened and 0.3% of $SrCO_3$ was added. Further, 0.3% of poly(tetramethylene-1,2-dicarboxylic acid) was added in the step for dispersing the particles into ethylene glycol. After classification and filtration, the particles had an average particle diameter of 0.4 microns. Thus, a biaxially oriented polyester film containing 0.4% of the calcium carbonate particles was prepared.

The properties of the obtained film are shown in Table 2 below.

EXAMPLE 12

Esterification reaction was effected by an apparatus for carring out the two-stage continuous esterification reaction. The apparatus was provided with an agitator, a partial condenser, an inlet for charging starting materials, and an outlet for removing out products.

Into the first stage reaction vessel, which contained the reaction product system, there was continuously fed a slurry of terephthalic acid in ethylene glycol in which the molar ratio of ethylene glycol to terephthalic acid had been adjusted to 1.30.

The reaction product was continuously removed out of the system, and successively charged into the second stage reaction vessel. Ethylene glycol was added in an amount of 0.2 molar equivalent per terephthalic acid unit charged. Further, magnesium acetate was added in such an amount as to provide 50 ppm of magnesium metal per polyester unit, and then ethyl acid phosphate was charged in an amount of 0.7 molar equivalent per molar equivalent of magnesium metal. Thus, the reaction was effected.

The reaction product having a number average polymerization degree of 7.4 was obtained with the rate of esterification of 96%. To a reaction vessel for effecting polycondensation reaction, there was charged 106 parts, this corresponding to 100 parts of ethylene terephthalate unit, of the esterification product. Then, the fine particles of calcium carbonate having an average particle diameter of 0.8 microns and containing 0.4% of poly(sodium acrylate), prepared in Example 8, were also added to the vessel in an amount such that the resulting polyester might contain 0.4% of calcium carbonate. Finally, 0.03 parts of antimony trioxide was added to effect polycondensation reaction.

The obtained polyester resin was used to prepare a biaxially oriented polyester film as in Example 8.

The properties of the resulting films are shown in Table 2.

COMPARATIVE EXAMPLE 4

The procedures of Example 8 were used to prepare calcium carbonate of 1.5 microns in average particle diameter, but no $SrCO_3$ was added. After crushing the particles by a sand grinder, 0.4% of poly(acrylic acid) was added, and the mixture was classified and filtered to obtain a slurry of particles having an average particle diameter of 0.8 microns in ethylene glycol.

The procedures of Example 8 were again repeated to prepare a biaxially oriented polyester film of 15 microns in thickness while using the slurry obtained above.

The properties of the film are also shown in Table 2.

As seen from Table 2, the pressure rise at the filter in the extrusion step is much higher in the composition of this Comparative Example 4 and the film derived from such a composition has more coarse protrusions due to agglomeration of particles as compared with the compositions and films of Examples according to the present invention described above. Thus, the film of this Comparative Example has poorer properties.

COMPARATIVE EXAMPLE 5

The procedures of Example 8 were repeated except that no poly(acrylic acid) was added to prepare a biaxially oriented polyester film.

The properties of the resulting film are also shown in Table 2.

As seen from Table 2, more coarse protrusions were observed in the film of this Comparative Example 5 as compared with the films of Examples described above. Thus, the film of this Comparative Example is not preferable.

COMPARATIVE EXAMPLE 6

The procedures of Example 8 were repeated except that the calcium carbonate-based particles were replaced by 0.4% of kaolin particles having an average particle diameter of 0.7 microns. Thus, there were prepared a polyester resin and a biaxially oriented film of 15 microns in thickness by extrusion.

The properties of the resulting film are also shown in Table 2.

As seen from Table 2, the film of this Comparative Example was poorer in the roughness, slipperiness, abrasion resistance and number of coarse protrusions as compared with the films of Examples according to the present invention.

TABLE 2

| | Additional compound contained in CaCO₃ | | | | | Amount of particles added to polyester (%) | Evaluated plugging of filter by resin | Average protrusion height Ra (μ) | Friction coefficient to metal (μ_d) | Number of coarse protrusions per 25 cm² | | Abrasion resistance |
|---|---|---|---|---|---|---|---|---|---|---|---|---|
| | Compound I | Added amount (%)** | Compound II | Ca-binding ability index mg CaO/g | Added amount (%) | Average particle diameter (μ) | | | | F₃ | F₄ | |
| Ex. 8 | SrCO₃ | 0.3 | Poly(acrylic acid) | 260 | 0.4 | 0.8 | 0.4 | 0.7 | 0.023 | 0.28 | 90 | 10 | Good |
| Ex. 9 | SrSO₄ | 0.4 | Sodium tripolyphosphate | 110 | 0.2 | 1.0 | 0.4 | 1.0 | 0.026 | 0.23 | 310 | 40 | Good |
| Ex. 10 | SrCO₃ | 0.3 | Poly((4-methoxy)-tetramethylene-1,2-dicarboxylic acid) | 250 | 0.5 | 0.6 | 0.4 | 0.6 | 0.014 | 0.29 | 50 | 10 | Fair |
| Ex. 11 | SrCO₃ | 0.3 | Poly(tetramethylene-1,2-dicarboxylic acid) | 240 | 0.3 | 0.4 | 0.4 | 0.6 | 0.008 | 0.31 | 60 | 20 | fair |
| Ex. 12 | SrCO₃ | 0.3 | Poly(sodium acrylate) | 260* | 0.4 | 0.8 | 0.4 | 1.0 | 0.024 | 0.27 | 360 | 50 | Good |
| Comp. Ex. 4 | — | — | Poly(acrylic acid) | 260 | 0.4 | 0.8 | 0.4 | 4.6 | 0.024 | 0.26 | 3000 | 650 | Good |
| Comp. Ex. 5 | SrCO₃ | 0.3 | — | — | — | 0.8 | 0.4 | 1.0 | 0.023 | 0.28 | 600 | 150 | Good |
| Comp. Ex. 6 | Kaolin particles | | | | | 0.7 | 0.4 | 1.0 | 0.018 | 0.34 | 900 | 180 | Poor |

*The value for polyacrylic acid will be used in place of that for polysodium acrylate.
**See footnote of Table 1.

EXAMPLE 13

Calcium carbonate containing 0.5% by weight of SrCO₃ was synthetically prepared and dispersed in ethylene glycol to make a slurry. Classification and filtration of the slurry gave an ethylene glycol slurry of calcium carbonate having an average particle diameter of 0.7 microns and a slurry concentration of 14%.

Separately, 100 parts of dimethyl terephthalate, 60 parts of ethylene glycol and 0.09 parts of magnesium acetate tetrahydrate were charged into a reaction vessel. Transesterification was effected by heating while distilling off methanol. After 4 hours, the temperature was increased to 230° C. to substantially terminate the transesterification reaction.

After adding 0.04 parts of ethyl acid phosphate to the reaction mixture, 2.9 parts of the above described slurry of synthetic calcium carbonate particles with an average particle diameter of 0.7 microns and then 0.04 parts of antimony trioxide were added. Polycondensation was effected for 4 hours to obtain a polyethylene terephthalate resin having an intrinsic viscosity of 0.65.

The polyester resin had a specific resistance of $0.433 \times 10^7$ ohm.cm in the molten state.

The obtained polyester resin was heated to dry at 180° C. in a nitrogen environment for 6 hours and extruded through an extruder at 290° C. into an amorphous sheet according to the electrostatic cooling method. In the method, a tungsten wire of 0.1 mm in diameter was used as a positive electrode, which was placed onto the surface of a rotating cooling drum along the direction perpendicular to the flow of the sheet and to which a direct current of 9000 V was applied.

The resulting amorphous sheet was then longitudinally stretched 3.7 times as largely as the original length and then transversely 4.0 times as largely as the original length. The amount of sheet extruded and the speed of the rotating cooling drum were adjusted such that a biaxially oriented film of 15 microns in thickness could always be obtained. The formation of pinning bubble and the non-uniformity in thickness of the resulting films were observed in relation to the speed of the drum.

The speed of the rotating cooling drum was gradually increased from 30 m/min. At the speed of 55 m/min, no pinning bubble was formed and the non-uniformity in thickness of the then resulting biaxially oriented film was as low as 0.1 which was entirely satisfactory.

The evaluated and/or estimated results onto the resulting film are listed in Table 3.

EXAMPLE 14

In the synthesis of calcium carbonate, there was prepared an ethylene glycol slurry of synthetic calcium carbonate of 0.6 microns in average particle diameter containing 0.4% SrSO₄ based on the resulting calcium carbonate.

Esterification reaction was effected by an apparatus for carring out the two-stage continuous esterification reaction. Into the first stage reaction vessel, which contained the reaction product system, there was continuously fed a slurry of terephthalic acid in ethylene glycol in which the molar ratio of ethylene glycol to terephthalic acid had been adjusted to 1.30. The reaction product was continuously removed out of the system, and successively charged into the second stage reaction vessel. Ethylene glycol was further added in an amount of 0.2 molar equivalent per unit equivalent of the charged terephthalic acid. Also, magnesium acetate was added in such an amount as to provide 50 ppm of magnesium metal per polyester unit, and then ethyl acid phosphate was charged in an amount of 0.7 molar equivalent per molar equivalent of magnesium metal. Thus, the reaction was effected. The reaction product having a number average polymerization degree of 7.6 was obtained with the rate of esterification of 97%.

To a reaction vessel for effecting polycondensation reaction, there were charged 106 parts, this corresponding to 100 parts of ethylene terephthalate unit, of the esterification product. Then, the ethylene glycol slurry of calcium carbonate having an average particle diameter of 0.6 microns, prepared above, was also added in an amount such that the resulting polyester might contain 0.6% of the calcium carbonate. Further, 0.04 parts of antimony trioxide was added to effect polycondensation reaction. Thus, a polyester resin having an intrinsic viscosity of 0.65 and a specific resistance in the molten state of $0.3 \times 10^7$ ohm.cm was obtained. The obtained polyester resin was used to prepare a biaxially oriented polyester film as in Example 13. The observed results on the resulting film are shown in Table 3.

EXAMPLE 15

A polyester resin with a specific resistance in the molten state of $10 \times 10^7$ ohm.cm containing precipitated internal particles comprising calcium, lithim and a phosphorus compound was separately prepared. Eighty (80) parts of the polyester resin was mixed with 20 parts of the polyester containing synthetic calcium carbonate having an average particle diameter of 0.7 microns, prepared in Example 13, and extruded through an extruder into an amorphous sheet of 220 microns in thickness, as in Example 13. Even at a speed of the rotating cooling drum of 45 m/min, no pinning bubble was formed. The non-uniformity in thickness of the resulting film was good and equaled to 0.11. Further, both the slipperiness and the number of coarse protrusions were satisfactory.

COMPARATIVE EXAMPLE 7

The polyester resin having a specific resistance in the molten state of $10 \times 10^7$ ohm.cm, used in Example 15, was subjected to the procedures of Example 13 to prepare an amorphous sheet. The formation of pinning bubble was observed at a speed of the rotating cooling drum of 40 m/min. Further, the film obtained at a speed of the drum of 45 m/min had a very poor non-uniformity in thickness of 0.31.

COMPARATIVE EXAMPLE 8

Calcium carbonate containing 0.001% or less of Sr, Ba and Mg compounds was crushed and classified to prepare an ethylene glycol slurry of particles having an average particle diameter of 1.2 microns.

Then, the procedures of Example 13 were repeated except that the magnesium acetate tetrahydrate was replaced by 0.009 parts of calcium acetate monohydrate and that 0.04 parts of orthophosphoric acid was added instead of the ethyl acid phosphate. Thus, a polyester resin containing 0.4% of calcium carbonate of 1.2 microns was obtained. The resin had a specific resistance in the molten state of $4.0 \times 10^7$ ohm.cm. The polyester resin was used to prepare an amorphous sheet by an extruder, as in Example 13. Pinning bubble was observed at a speed of the rotating cooling drum of 50 m/min where the film had a poor non-uniformity of 0.33. The resulting biaxially oriented film had many coarse protrusions.

TABLE 3

| | Added particles | | | | | | | | Number of | |
| | Additional compound contained in CaCO$_3$ | | Average particle diameter ($\mu$) | Amount of particles added to polyester (%) | Specific resistance of polyester resin $10^7$ $\Omega \cdot$ cm | Film-forming speed (m/min) & observation of film | Non-uniformity in thickness | Average protrusion height Ra ($\mu$) | Friction coefficient to metal ($\mu_d$) | coarse protrusions per 25 cm$^2$ | | Abrasion resistance |
| | Kind | Added amount (%)* | | | | | | | | F$_3$ | F$_4$ | |
|---|---|---|---|---|---|---|---|---|---|---|---|---|
| Ex. 13 | SrCO$_3$ | 0.5 | 0.7 | 0.4 | 0.4 | 55 no pinning bubble | 0.10 | 0.016 | 0.24 | 660 | 120 | Good |
| Ex. 14 | SrSO$_4$ | 0.4 | 0.6 | 0.6 | 0.3 | 55 no pinning bubble | 0.09 | 0.017 | 0.23 | 570 | 90 | Good |
| Ex. 15 | SrCO$_3$ | 0.5 | 0.7 | 0.08 | 0.4/(10) | 45 no pinning bubble | 0.11 | 0.013 | 0.28 | 350 | 40 | Fair |
| Comp. Ex. 7 | — | — | — | — | 10 | 45 pinning bubble | 0.31 | 0.012 | 0.33 | 300 | 30 | Poor |
| Comp. Ex. 8 | Sr, Ba, Mg compounds | ≦0.001 | 1.2 | 0.4 | 4.0 | 50 pinning bubble | 0.33 | 0.025 | 0.23 | 3600 | 350 | Good |

*See footnote of Table 1.

What is claimed is:

1. A polyester composition comprising a polymeric saturated polyester and 0.001–5% by weight of particles which have an average particle size of 0.05–5 micrometers, said particles being mainly composed of calcium carbonate, and containing 0.001–5% by weight of at least one compound selected from the group consisting of magnesium (Mg) compounds, strontium (Sr) compounds and barium (Ba) compounds.

2. The composition of claim 1, wherein said group consists of salts, halides, hydroxides and oxides of Mg, Sr and Ba.

3. The composition of claim 1, wherein the particles mainly composed of calcium carbinate contain 0.01–5% by weight of at least one of the Mg, Sr and Ba compounds based on the weight of the calcium carbonate.

4. The composition of claim 1, comprising 0.01–5% by weight of the particles mainly composed of calcium carbonate.

5. The composition of claim 1, wherein said particles mainly composed of calcium carbonate are obtained by reacting an aqueous suspension of calcium hydroxide with carbonic acid gas in the presence of at least one compound selected from the group consisting of Mg, Sr and Ba compounds.

6. The composition of claim 1, further comprising 0.001–10% by weight, based on the weight of calcium carbonate, of an additional compound having a calcium binding ability at 90° C. of 100 or more, in addition to the particles mainly composed of calcium carbonate.

7. The composition of claim 6, wherein the additional compound has a calcium binding ability at 90° C. of 150 or more.

8. In a process for preparing a polyester film by the electrostatic cooling method, the improvement comprising utilizing, as a starting material, a polyester composition comprising a polymeric saturated polyester and 0.001-5% by weight of particles which have an average particle size of 0.05-5 micrometers, said particles being mainly composed of calcium carbonate, and containing 0.001-5% by weight of at least one compound selected from the group consisting of magnesium compounds, strontium compounds and barium compounds.

* * * * *